(12) United States Patent
Vedam

(10) Patent No.: US 11,240,139 B2
(45) Date of Patent: Feb. 1, 2022

(54) GENERATING A MINIMUM-COST CIRCULATION TOPOLOGY IN A MICROSERVICE MESH NETWORK

(71) Applicant: Intuit Inc., Mountain View, CA (US)

(72) Inventor: Venkat Narayan Vedam, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 10 days.

(21) Appl. No.: 16/669,009

(22) Filed: Oct. 30, 2019

(65) Prior Publication Data

US 2021/0135973 A1    May 6, 2021

(51) Int. Cl.

| H04L 12/751 | (2013.01) |
|---|---|
| H04L 29/08 | (2006.01) |
| G06F 9/54 | (2006.01) |
| G06F 16/245 | (2019.01) |
| H04L 12/721 | (2013.01) |

(52) U.S. Cl.
CPC .............. *H04L 45/02* (2013.01); *G06F 9/54* (2013.01); *G06F 16/245* (2019.01); *H04L 45/12* (2013.01); *H04L 67/10* (2013.01)

(58) Field of Classification Search
CPC ......... H04L 45/02; H04L 45/12; H04L 67/10; G06F 9/54; G06F 16/245

USPC ........................................................ 709/241
See application file for complete search history.

(56) References Cited

U.S. PATENT DOCUMENTS

| 2007/0147255 | A1* | 6/2007 | Oyman ................. H04L 45/125 370/238 |
| 2012/0131139 | A1* | 5/2012 | Siripurapu .............. H04L 65/60 709/217 |
| 2018/0295036 | A1* | 10/2018 | Krishnamurthy ... G06F 11/3006 |

* cited by examiner

*Primary Examiner* — David R Lazaro
*Assistant Examiner* — Zia Khurshid
(74) *Attorney, Agent, or Firm* — DLA Piper LLP (US)

(57) ABSTRACT

A computer-implemented system and method for generating a minimum-cost circulation topology in a mesh network is provided. The system comprises one or more processors configured to receive a service request from a client computer and identify a group of services for the service request. The one or more processors are further configured to iteratively query a global registry for each of the group of services to obtain respective groups of dependent service instances, generate an adjacency table including a plurality of service dependency paths identified from the respective groups of dependent service instances. The system determines a minimum-cost service dependency path by applying a predetermined cost algorithm on the adjacency table and executing a first service instance of the minimum-cost service dependency path and route the service request to the second service instance in the dependency path.

20 Claims, 9 Drawing Sheets

GENERATING A MINIMUM-COST CIRCULATION TOPOLOGY IN A MICROSERVICE MESH NETWORK

The present disclosure relates to microservice-based architecture, and more specifically to generating a minimum-cost circulation topology for traffic routing across service instances in a micro-service mesh network.

A service mesh network is a lattice network for deploying dependent software components at various levels through the complex topology of services in a microservice-based architecture in a cloud computing environment. The software components may be implemented as corresponding services, such as micro-services, nano-services, or other standard types of services. A software application is, for example, based on micro-services and separated into a plurality of individual micro/nano-services encapsulated into a plurality of containers according to different application functionalities. The deployment of micro-services may be helpful in isolating functionality in a distributed software application so that the entire application does not have to be redeployed every time a change is made to an individual component. The service mesh network may include a plurality of interdependent micro-services deployed in service linkage paths across clusters, the cloud and networks.

Current deployment solutions usually use load balancers, Geo-DNS, traffic dialing and declarative service interconnects which are configured with human intervention. A deployment unit may be a hosted entity that provides a plural of micro-services each encapsulated under a load balancer that serves as an interface for external consumer service. Each service talks to a service-bundle which decides the availability at the ingress to the service-bundle.

Current service linkage is at a meta deployment unit level. For example, a root service A has dependencies on and consumes a service B which in turn depends on and consumes a service G. When microservices-based applications are used on a worldwide scale, it becomes necessary to deploy application services to regional deployment units (e.g., servers or data centers) all around the world. There may be many limitations to route an upstream service to the dependent service endpoints hosted in deployment units made available typically in 2 to 3 rendezvous geo-replicas in the current service mesh network. For example, an upstream service may not provide a visibility of the topology and/or does not have topology information or status of downstream services at each level. The upstream service may not instantly discover and reroute to an available service instance when other dependent service instances are not available (e.g., goes offline) or the current next available service instance offers higher cost. In the current state, scaling (e.g., horizontal scaling) is handled inside the deployment unit via adding more services to handle the increase in demand. Though this seems to solve the scaling aspect, it only does so in latent time by virtue of the time to bring additional nodes online. It can become costly and difficult to handle the traffic of routing services and keep the deployed services synchronized across different geographical areas in the mesh network. As such there is a need to build an optimized routing topology in the micro/nano-service mesh network while maintaining the reliable delivery of service-to-service communication through the complex topology of services in a cloud computing environment.

BRIEF DESCRIPTION OF THE FIGURES

The foregoing and other aspects of embodiments are described in further detail with reference to the accompanying drawings, in which the same elements in different figures are referred to by common reference numerals. The embodiments are illustrated by way of example and should not be construed to limit the present disclosure.

DETAILED DESCRIPTION

Figure 1:
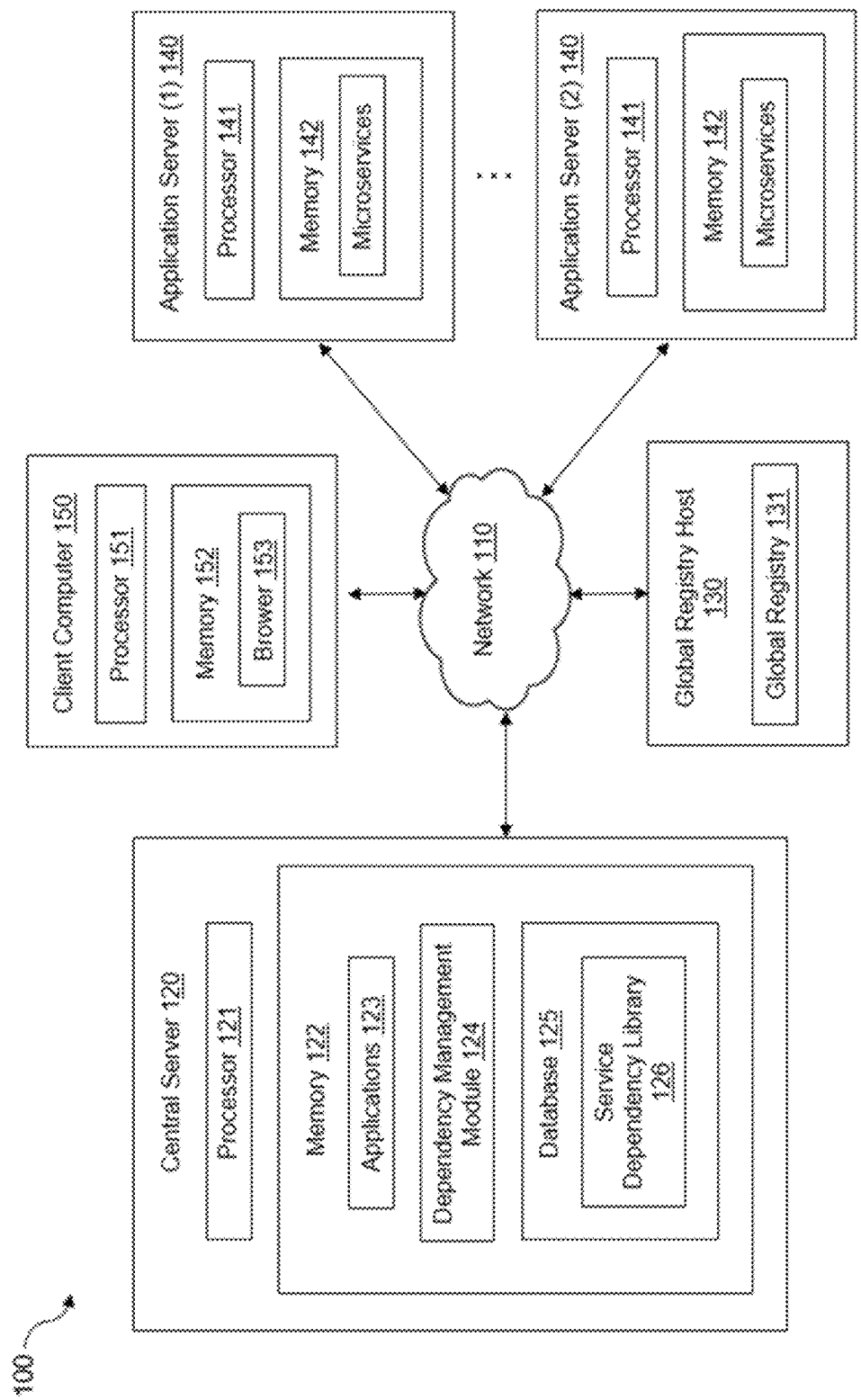
FIG. 1 illustrates an example computing environment according to some embodiments of the present disclosure.

Embodiments of the present disclosure describe techniques of utilizing container-based services runtime encapsulation and technologies to generate a circulation topology with a minimized cost for discovering, linking and routing micro/nano-services in service mesh network for service deployment.

The microservices-based architecture may provide rapid development of software applications as a plurality of independently deployable micro-services in which each service application or service instance runs a unique process and communicates through a well-defined, lightweight mechanism to serve a defined functionality. These services may be encapsulated into containers running in deployment units all over the world. These services may be discovered, linked and routed based on service dependency paths through application programming interface (API) calls in a micro-services architecture.

The microservices-based architectures may facilitate continuous delivery and deployment of software development process to improve software agility, scalability, and autonomy to micro-services architectures so as to respond rapidly to the client demands of the applications.

Services in a micro-services architecture may be independently deployable. Services can be implemented using different programming languages, databases, hardware and software environment. A service may be a single unit of programmable software and may be built with more than one micro-service. Microservices-based architectures may be adopted for cloud-native applications and applications using lightweight container deployment.

With micro-services, only the micro-service supporting the function with resource constraints needs to be scaled out, thus providing resource and cost optimization benefits. Routing a service instance to different adjacent dependent service instances may be associated with different costs. In a microservices-based architecture, for example, the system's runtime scalability may refer to its adaptability (at a reasonable cost) to changes in the number of users accessing it or refer to the development process ability to accommodate many developers working on it in parallel.

Embodiments of the present disclosure may provide a discoverable, fast-recoverable, re-routable and resilient self-organizing microservices-based architecture with a minimum-cost circulation topology. Embodiments of the present disclosure may provide faster delivery of application services to respond to and satisfy customer expectations.

Embodiments of the present disclosure describe techniques of establishing a computer-implemented system and method to create a minimum-cost circulation topology for deploying an application in a micro/nano-service network.

RESTful services may be manifesting in micro/nano quantum and each service may expose a key functionality via Application Programming Interfaces (APIs). For example, an IP-geocoding micro-service exposes APIs to retrieve a geolocation for a given IP address. Services of this quantum may exist as a mesh network connected on a local or wide area network.

The present disclosure provides a practical solution of dynamically discovering, linking and routing micro/nano-services over a dense services mesh network in a minimum cost topology.

Embodiments described herein may apply dynamically configurable routing rules to discover, link and route any type of services for providing accurate responses to clients' inquiries globally. Embodiments described herein may maintain a reliable delivery of service-to-service communication through the complex topology of services in a cloud computing environment.

As used in this application, "global registry" includes, but is not limited to, one or more separate and independent software and/or hardware components of a computer that may be added to a general purpose computer before the computer can link and route computer-implemented functional services to other computers and software and provide a minimum-cost circulation topology in order to share data or hardware and software resources among the other computers and software, and computers having such components added thereto.

As used in this application, "service instances" may include but is not limited to "micro-services" and/or "nano-services" in various embodiments described herein. The "service instances" may be program components or program application configured with computer executable instructions which, when executed by a process, may perform computing functions.

FIG. 1 illustrates an example computing environment 100 in a cloud hosting platform according to some embodiments of the present disclosure. As shown, the computing environment 100 includes a central server computer 120, a global registry host 130, a plurality of application servers 140, a plurality of client computers 150, and networks 110. The computing environment 100 may be a cloud computing environment including service-oriented architectures and cloud computing platforms for deploying computer-implemented components in the forms of micro/nano-services to clients in response to clients' requests over the cloud via networks 110. Networks 110 may include the Internet and/or other public or private networks or combinations thereof.

Central server computer 120 may be operated as a control panel in response to client service inquiries for delivering computer-implemented components. Central server computer 120 may in communication with a global registry host 130, a plurality of application servers 140, a plurality of client computers 150 via networks 110 in a cloud computing environment. Central server 120 (e.g., central server computer) may include one or more processors 121, which may be configured to collect and process the data, a memory 122 and a communication interface for enabling communication over networks 110. Central server 120 may include one or more applications 123 and a dependency management module 124 stored in memory 122. Applications 123 may be executed by the one or more processors 121 for providing configured application functions, services or hosting a website with particular services for users to visit and obtain information. Applications 123 may include a web application that can be accessed by client device 150 via a browser application 143 to process user inquiries. A dependency management module 124 may be configured to generate dependent services or service instances in response to client's inquiries for software components and application processes deployed in application servers 140.

Central server 120 may be in communication with a plurality of application servers 140 in response to user requests for deploying applications to a plurality of client devices 150 via a network 110. As shown, central server computer 120 may receive a service request from client computer 140 via a browser 143. The browser 143 may be used by a client (e.g., user) to send a request or query to central server 120. The query may be generated using a variety of Application Programming Interfaces (API) query languages.

Database 125 may be communicatively coupled to central server 120 to receive instructions or data from and send data to central server 120 via networks 110. Database 125 may store a service dependency library 126 which may be used with a dependency management module 124 to generate dependent services or service instances. Database 125 may store client profiles and historical client behaviors while users interact with central server 120 regarding various products or services through client devices 150 via networks 110. Database 125 may be a shared remote database, a cloud database, or an on-site central database.

Central server 120 and client device 150 are each depicted as single devices for ease of illustration, but those of ordinary skill in the art will appreciate that application server 120, and/or client device 140 may be embodied in different forms for different implementations. For example, central server 120 may include a plurality of servers in communication with each other through networks 110. Alternatively, the operations performed by application server 120 may be performed on a single server. In another example, a plurality of client devices 140 may communicate with application server 120. Client device 140 may be any device configured to present user interfaces and receive user inputs thereto. For example, client device 140 may be a smartphone, personal computer, tablet, laptop computer, mobile device, or other device. Client device 140 may include a processor 141, a memory 142, and a browser application 143. Browser application 143 may facilitate user interaction with application server 120 and be configured to transmit information to and receive information from application server 120 via networks 110. Client device 140 may be any device configured to present user interfaces and receive inputs thereto. For example, client device 140 may be a smartphone, personal computer, tablet, laptop computer, or other device.

The global registry host 130 may be a physical computing device or a virtual machine hosting a global registry 131 in a cloud hosting environment. Global registry host 130 may be coupled to central server 120 and in communication with each of the plurality of application servers 140 in a service mesh via networks 110. Global registry 131 may be referred to as a distributed entity where every instance of a service registers as an available instance.

Figure 2:
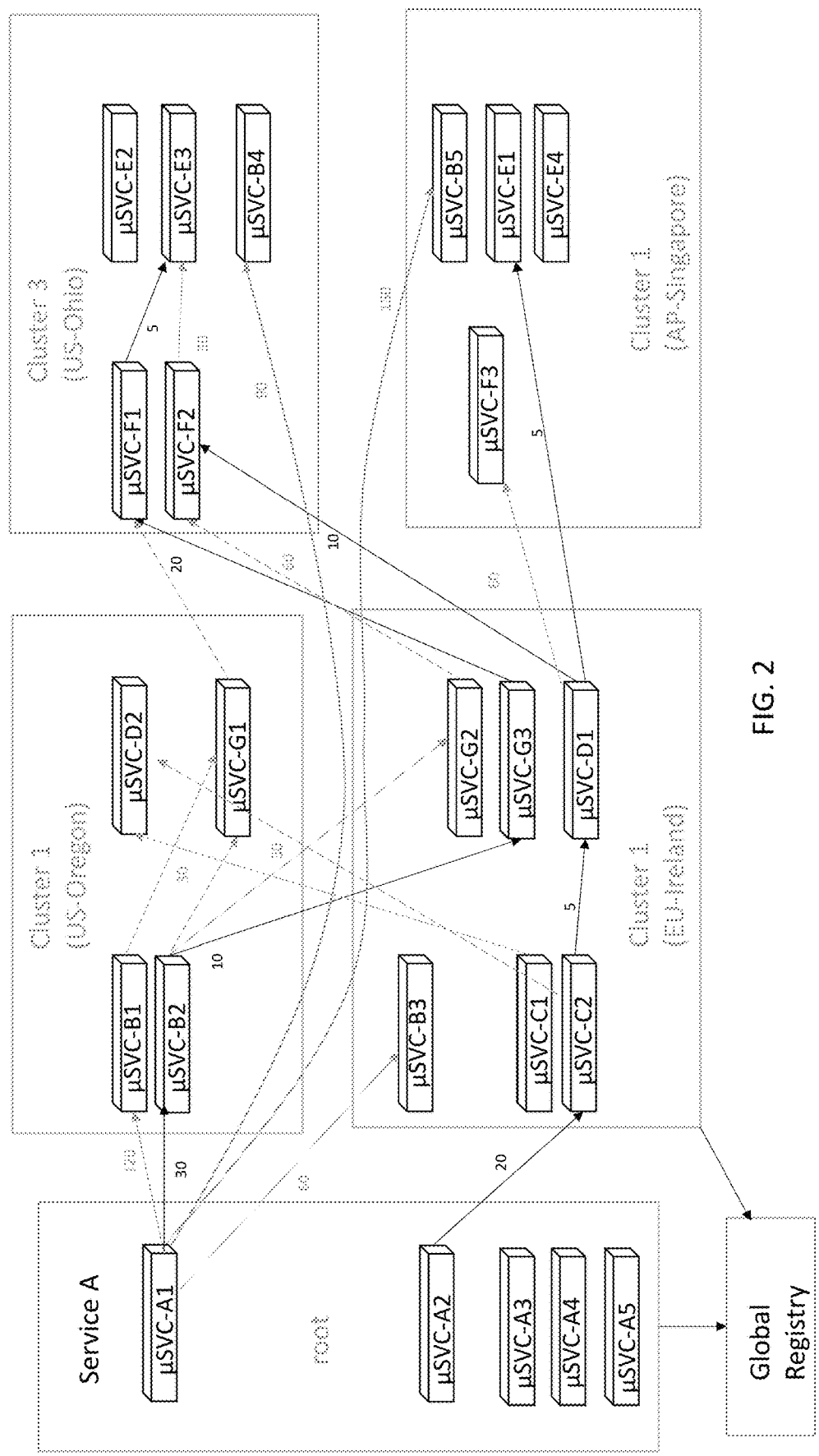
FIG. 2 illustrates an example service mesh for deploying service instances among clusters according to some embodiments of the present disclosure.

FIG. 2 illustrates an example service mesh 200 according to some embodiments. In micro-services architecture, an application may be broken into modular components or programs to be distributed across the cloud and application servers 140. The service mesh 200 may be a microservice-oriented container network 200 and include a plurality of microservice-based clusters associated with a plurality of application servers 140 located in different geographical areas. A plurality of micro-services associated with different applications may be exposed in a plurality of Kubernetes clusters located in different geographical areas.

As illustrated in FIG. 2, the service mesh 200 may include multiple clusters which are implemented as multiple Kubernetes clusters in different regions, such as US-Ohio, US-Oreg., EU-Ireland regions, etc. Each Kubernetes cluster may include a plurality of containers hosting a plurality of service instances associated with the same or different applications. The service instances may form a multi-level dependency graph and each service instance may be indicative of a node which represents a container hosted by an application server 140, a computer system or a visual machine. Each application server 140 may host and execute a plurality of service instances associated with one or more services. Each cluster may include a plurality of nodes each associated to a service instance. The nodes may be interconnected in different Kubernetes clusters located in different geographic areas in a multi-level dependency graph shown in FIG. 2.

Deploying an application over the service mesh may involve in routing and deploying a sequence of interdependent services to a client computer 150 at a service request location. An upstream service may depend on a downstream dependent service and the downstream dependent service may consume the corresponding upstream service. For example, an application service requested by a client may include a plurality of services linked in a predetermined order, such as services A→B→G→F→D→E. The plurality of the services may be linked with each other as a service dependency path in a predetermined order have predetermined dependency relationships among each other. For example, service A depends on service B, service B depends on service G, service G depends on service F, and service F depends on E, etc. Each service may be represented by a plurality of replicated service instances (micro-services or nano-services) hosted by containers and exposed in different Kubernetes clusters globally. The example service mesh 200 may be formed as a multi-level dependency meta-graph with a plurality of service having dependency relationships among each other.

Each instance in a multi-level dependency graph manifests as a node in the meta-graph of interdependent services.

TABLE 1

| Service | Service Instances (Micro/Nano-Services μSVC) | Corresponding Dependency Services |
|---|---|---|
| Service A | Service Instances (A1, A2, A3, A4, A5) | Service Instances (B1, B2, B3, B4, B5) |
| Service B | Service Instances (B1, B2, B3, B4, B5) | Service Instances (G1, G2, G3, G4) |
| Service C | Service Instances (C1, C2) | ... |
| Service D | Service Instances (D1, D2) | ... |
| Service E | Service Instances (E1, E2) | ... |
| Service F | Service Instances (F1, F2, F3, F4) | Service Instances (E1, E2, E3, E4) |
| Service G | Service Instances (G1, G2, G3, G4) | Service Instances (F1, F2) |

Table 1 shows a list of services, corresponding replicated service instances, corresponding replicated dependency services as illustrated in FIG. 2. For example, every service A that is a running service may manifest as a plurality of replicated service instances (A1, A2, A3, A4, A5) in a geographically distributed fashion. Every service may manifest as a plurality of replicated service instances hosted in different containers which are deployed in a plurality of Kubernetes clusters in different regional and geographical areas. The service instance A1 may have a list of dependency service instances B1, B2, B3, B4, and B5.

As shown in FIG. 2, each Kubernetes cluster may include a plurality of containers for micro-services associated with different applications. Each service instance (e.g., microservice or nano-service) may be a software component or program and run in a service container in a Kubernetes pod (not shown) in a service mesh 200. The Kubernetes pod may be assigned with a unique IP address and represent a deployment unit for a single instance of an application. In some embodiments, a pod may consist of either a single container or a small number of containers that are tightly coupled and that share resources.

Each service instance (e.g., μSVC-A1) may be run in a container executed by an application server 140. Service instance μSVC-A1 may be indicated as a root or original service and manifest as a plurality of container-based micro-services μSVC-A1, μSVC-A2, μSVC-A3, μSVC-A4, and μSVC-A5. Service B may include a group of service instances μSVC-B1, μSVC-B2, μSVC-B3, μSVC-B4, and μSVC-B5. A service instance may be run in a container configured to be executed by an application server 140. The same or different service instances may run in different containers in different Kubernetes clusters located in different regions or geographical areas. As shown in FIG. 2. The service instances μSVC-B1 and μSVC-B2 run in cluster 1 ("US-Oreg."). The service instance μSVC-B3 runs in cluster 2 ("EU-Ireland"). The service instance μSVC-B4 runs in cluster 3 ("US-Ohio"). The service instance μSVC-B5 runs in cluster 4 ("AP-Singapore").

Figure 3:
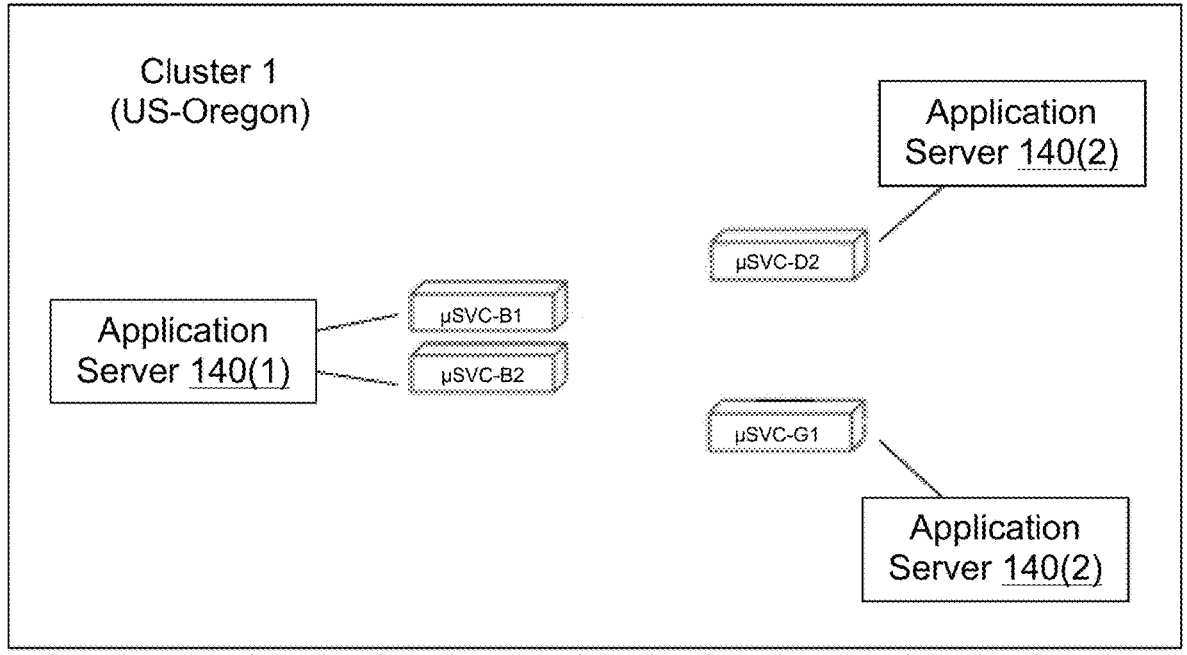
FIG. 3 illustrates an example system diagram including a cluster according to some embodiments of the present disclosure.

FIG. 3 illustrates an example system diagram including a cluster according to some embodiments of the present disclosure. The example system diagram of FIG. 3 includes a cluster 1 as illustrated in FIG. 2. The cluster 1 may include a plurality of computing systems such as application servers 140 each being configured to execute one or more service instances. For example, application servers 140 (1) may be indicative as a node and configured to execute micro-services B1 and B2.

Figure 4:
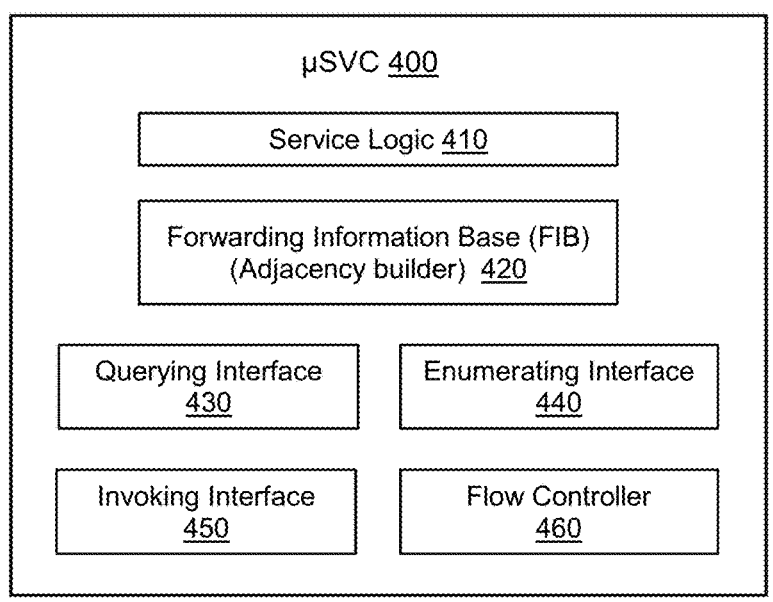
FIG. 4 illustrates a schematic diagram of an example service instance according to some embodiments of the present disclosure.

FIG. 4 illustrates a logic diagram of an example service instance 400 run in a container within the container platform 200 according to some embodiments. A service instance 400 may include a plurality of computer components for implementing particular functionality. A service instance 400 may include a service logic 410, a Forwarding Information Base (FIB) 420, a querying interface 430, an enumerating interface 440, invoking interface 450, and a flow controller 460. The flow controller 460 may ensure that it detects the error status codes from a downstream service instance and adjusts the egress traffic to the next set of paths in the FIB per the sensing in degradation. The flow controller 460 may ensure quality of service for the ingress traffic to the service instance. The flow controller 460 may be implementing differentiated services (DiffServ) architecture pattern. A service instance 400 may query the global registry 131 to retrieve a list of dependent service instances which may be indicative as an array of the next adjacent service instances. Each service instance may discover its next hop dependency instances via the querying interface 430 based on the Global Registry 131. The querying interface 430 may be configured to query the global registry 131 to retrieve a list of next hope active dependency service instances. For example, service instance A1 may query the global registry 131 to retrieve a list of next hope active dependency service instances (B1, B2, B3, B4, B5). The querying interface 430 may further be configured to query the dependent service instances for the instance metadata. Each Service instance may carry metadata representing its state that could be read via the querying interface 430. The metadata of each service instance may include various features such as instance-state, instance-load, instance-capacity, cost, FIB as calculated and determined at that service instance, etc. Each service instance may interface with the invoke interface 450 of another service instances. The enumerating interface 440 may be enabled to describe the Forwarding Information Base (FIB) 420 as seen from that respective service instance. The Forwarding Information Base (FIB) 420 stores an adjacent table or topology graph associated with the corresponding service instance. The runtime status of each service instance 400 may be active, dormant, in-maintenance, or terminated, etc. Every service instance offers an invoking interface configured to update a state transition in instance runtime, such as "RUN_ACTIVE," "RUN_DORMANT", "RUN_IN-MAINTENANCE", "RUN_TERMINATED", etc. The service logic 410 may be the practical business implementation of the service itself, such as shopping cart service, geo-location service, etc.

Figure 5:
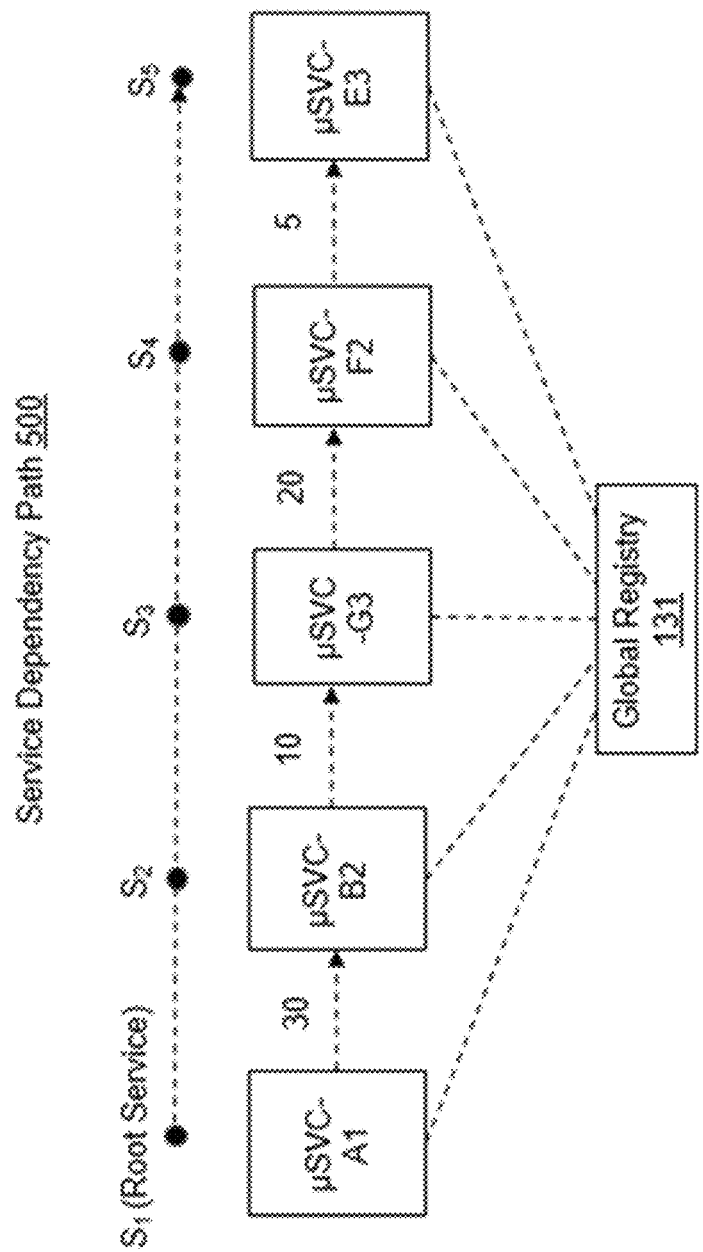
FIG. 5 illustrates a schematic diagram of an example service dependency path according to some embodiments of the present disclosure.

FIG. 5 illustrates a schematic diagram of an example service dependency path 500 associated with a service request from a client computer. The example service dependency path may be a group of service instances including predefined dependency relationships between each pair of adjacent instances. For example, the predefined dependency relationships between each pair of adjacent instances of the sequence may be indicative of instances A→B→G→F→E. The group of service instances may be run in a plurality of containers located in different geographic areas and hosted by a plurality of application servers 140 in a service mesh 200 as illustrated in FIG. 2. Each service instance (e.g., A) in the service mesh 200 may register with a global registry 131 on a global registry host 130 with its corresponding metadata and runtime status over a network 110. The metadata of each available service instance may include data associated with a container running the corresponding service instance, such as a service name, an IP address, and a port number, etc. For each available service instance, global registry 131 may be configured to execute an API discovery process to discover corresponding dependent service instances. Global registry 131 may update runtime status of each service instance on the container platform 200 periodically (e.g., 2-3 seconds). Global registry 131 may provide available service instances within the service mesh 200. For example, if a calling service instance A3 needs to invoke service C, the instance service A3 may query the global registry 131 to discover which instances of service C (e.g., C1, C2, C3) are available i.e. Global registry 131 may store metadata of each available service instance as a data structure or a table. Each service instance 400 may be in a constantly-changing state as they are dynamically scheduled by an orchestrator like Kubernetes. The global registry 131 may automatically discover and record runtime status of available service instances in the container network 200 to ensure service communication performance and reliability. Global registry 150 may detect the updated status of service instances in the container network 200 and further add, delete, and change the runtime status of each service instance in the container network 200. The updated active dependency instances may populate the runtime status.

Figures 6, 7:
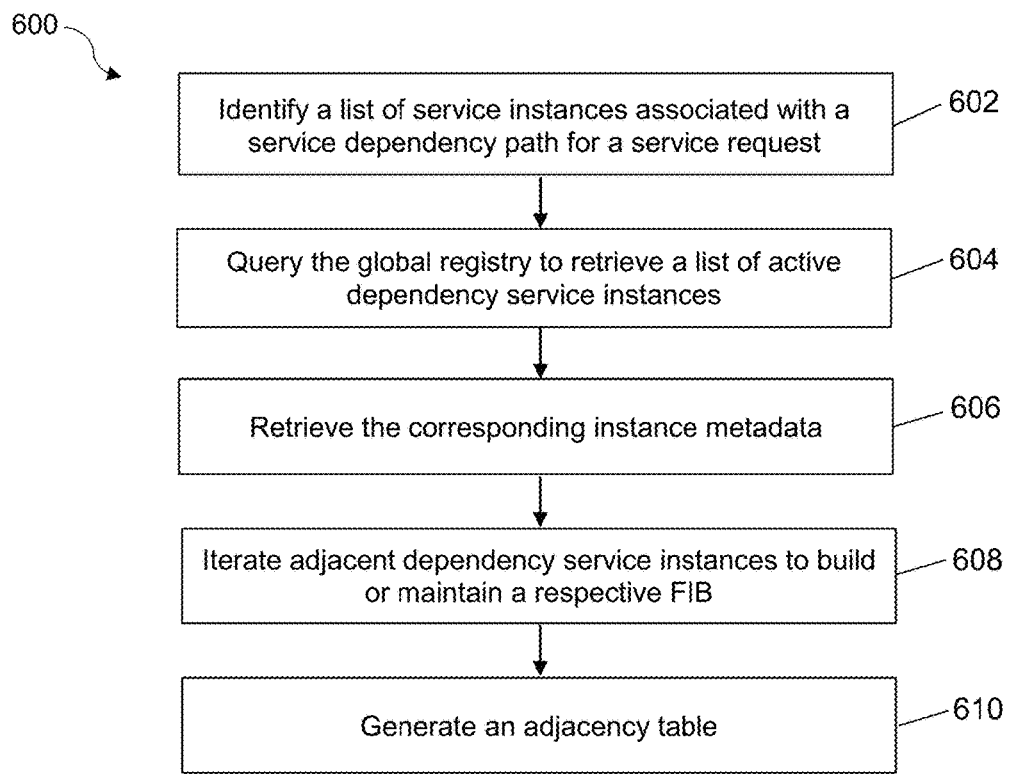
FIG. 6 is a flowchart illustrating an example process configured to generate an adjacency table for a service instance according to some embodiments of the present disclosure.
FIG. 7 illustrates an example adjacency table associated with the root service instance A1 associated with a container according to one embodiment.

FIG. 6 is a flowchart illustrating an example process 600 configured to generate an adjacency table in response to a service request according to some embodiments. The process 600 may be configured as computer programs (e.g., software) executed on one or more computers including and center server 120, a global registry host 130, and application servers 140, in which the systems, service instances, processes, and embodiments described below can be implemented.

At step 602, the center server 120 or global registry host 130 may include at least one application with a dependency management module and a service dependency library configured to identify a list of service instances with a service dependency path 500 based on the user request or inquiry. For example, referring back to FIG. 3, the service dependency path 500 may include a group of service instances and the corresponding predefined dependency relationships. As illustrated in FIG. 5, the predefined dependency relationships between each pair of service dependency path may be indicative of instances A→B→G→F→E. Each service instance of a service dependency sequence may have been registered with a global registry 131 with its corresponding metadata and runtime status over a network 110.

At step 604, each service instance associated with the service dependency path 500 may be configured to iteratively query the global registry 131 to discover and retrieve a respective list or array of active dependency service instances in service mesh 200 over the network 110. For example, the service instance A1 may be configured to identify its dependencies and query the global registry 131 to retrieve a list of the dependent adjacency service instances B1, B2, B3, B4, and B5.

At step 606, each service instance (A1) may directly interface with the invoke interface 450 of each of its dependency service instances (B1, B2, B3.) to retrieve the corresponding instance metadata, such as instance active status. For example, when service instances B1 and B2 are identified as active dependency instance of the root service instance A1, the service instance may use the query interface of the dependent service instances to retrieve the instance metadata of the service instances B1 and B2. The dependent service instances B1 and B2 may each provide an invoking interface 450 that pursues the intent of the calling entity A1 (e.g., the upstream root service instance).

At step 608, each service instance an adjacency builder may be setup to iterate its dependency path called adjacencies (e.g., adjacent dependency service instances) and build or maintain a respective "forwarding information base"

(FIB). The FIB contains the end to end path for each possible pathway in the service dependency graph. The root service A1 can invoke and query the respective adjacent service instances. Referring back to FIG. 2, the root service A1 may invoke and query service instances of B1 and B2 via the respective querying interface 430 and invoking interface 450 to retrieve the respective metadata and obtain the runtime state of the corresponding adjacent service instances. The service instance B2 may invoke and query the service instances G2 and G3. The service instance G3 may invoke and query the service instances F1 and F2. Based on status of adjacent dependency instances provided by the global registry 131, each service instance may interface with the invoking interfaces 450 of the adjacent dependency instance to obtain the runtime state of the adjacent dependency instance. The actions themselves may be implemented on a designated network traffic port, for example.

At step 610, each service instance may collate the corresponding dependency (next hops) information into an adjacency table with respect to an order of the service dependency path 500. Based on the updated instance status by the global registry 131, a service instance may interface with invoking interfaces 450 of other available service instances based on the global registry 131 to obtain the dependency information of the steps 602-610 may be iteratively operated for adjacent service instances along the service dependent path to collate the dependency information (e.g., cost) associated with one or more next active adjacent service instances into an adjacency table. An adjacency table may include a plurality of service dependency paths identified from the respective groups of dependent service instances.

At a service instance (e.g. A1), the adjacency table may be populated with all the possible routes to the next dependency service instance(s) and its further downstream dependencies thereof. On the collated possible paths of dependent-services-instances represented as a graph, a single source shortest path algorithm may be run iteratively on the cost of reaching to the last dependency instance in the service-instances-graph. Once the shortest paths costs are calculated for all the possible paths, the adjacency table can be sorted on the overall cost for each path. Thus, the preferred shorted path may be determined per service. The sorted adjacency table constitutes the forwarding information base (FIB).

In some embodiments, a service instance may run as a container in a Kubernetes pod. In the container network 200, a side-car adjacency-management container may be coupled to the container holding the present service instance in the same Kubernetes pod with a unique IP address and represent a deployment unit for a single instance of an application. The side-car may represent a component on behalf of the associated service instance in the same pod. The side-car adjacency-builder management container may be executed as the determinant to build and maintain the adjacency table and the corresponding FIB in each service instance. The side-car adjacency-management container associated with each service instance of the service request may be configured to dynamically discover active adjacencies instances for respective active services B, G, F, D, and E. The side-car adjacency-management container may be configured to discover active service instances of the upstream service instance A1. For example, the side-car associated with the root service instance A1 may be configured to discover active dependent service instances including one or more of instances of B1, B2, B3, B4, and B5. The side-car adjacency-management container may be configured to build and maintain FIB in every service instance. The FIB can be refreshed in a configurable cadence in the side-car per service-instance updates into the adjacency table. The side-car adjacency-management container may have a plurality of features and pursue a plurality of defined functions to facilitate the routings of service instances and determine a minimum cost route for delivering a service dependent path of the service instances as described above. Each service instance may be configured to maintain the respective service-instance FIB which can be refreshed in a configurable cadence in the side-car per service-instance updates into the adjacency table.

FIG. 7 illustrates an example adjacent table associated with the root service instance A1 associated with a container according to one embodiment. As shown, the service instance A1 may build a graph with all active dependency paths up to the last dependent service in the service dependency paths. The dependency paths associated with the service instance A1 are illustrated in FIG. 2 and shown as different paths from the root service instance to all dependency of adjacent service instances. The first row of the adjacent table shows a service dependency path 500 as illustrated in FIG. 5.

Figure 8:
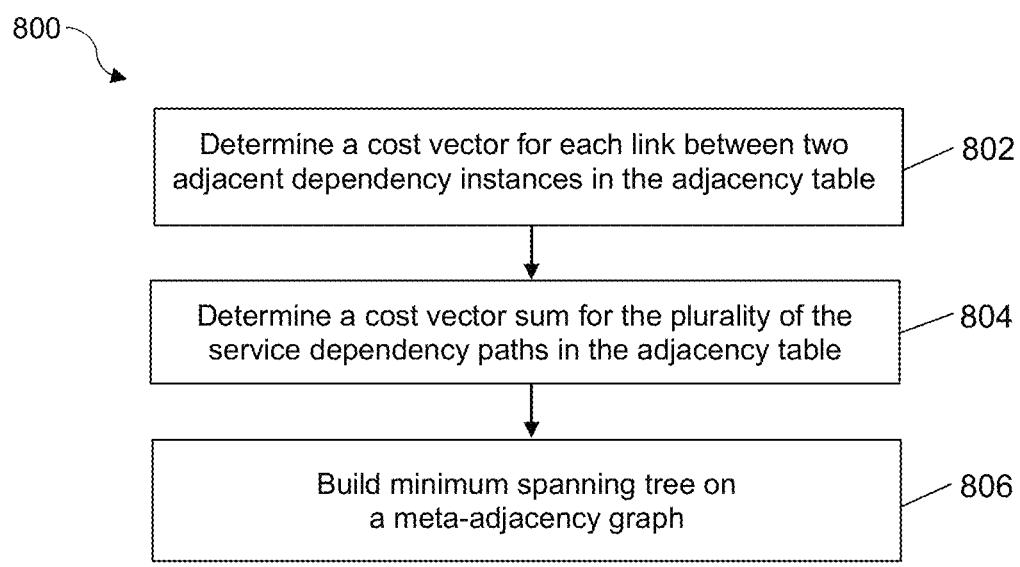
FIG. 8 is a flowchart illustrating an example process configured to determine a service routing link with a minimum cost according to some embodiments of the present disclosure.

FIG. 8 is a flowchart illustrating an example process 800 configured to determine a service routing link with a minimum cost according to some embodiments of the present disclosure. The process 800 may be configured as computer programs (e.g., software) executed on one or more computers including a center server 120, a global registry host 130 and application servers 140, in which the systems, service instances, processes, and embodiments described below can be implemented.

At step 802, a minimum cost decision algorithm may be run to determine a cost vector for each link between each pair of two active and adjacent dependency instances in the adjacent table along each service dependency path. A cost vector may be determined for each link between two dependency instances. Each service instance in the adjacency table may build its own topology graph with containers occupied by dependency instances associating respective connecting link with a path cost.

Each service instance may populate the adjacency table with its next hop or routing details associated with the cost vector. In some embodiments, a cost vector may be defined as a Round Trip Time (RTT). In some embodiments, a cost vector may be determined by a distance calculator. The distance calculator may be configured to be a complex predefined function associated with various parameters or features, such as RTT, load on service-instance, upgrade-cycle, security-status, geo-fencing status, regulatory fencing, etc. Referring back to FIG. 2, the adjacent table shows that the original service instance A1 are linked to two active dependency service instances B1, B2. Each service instance (e.g., A1) may build an adjacency list of dependency services with a "cost" vector for each service linkage for an application deployment. A cost to route a service may be set as an unlimited value for a link between a root service instance to a unavailable dependency service instance. An unlimited cost may be set to signify routing links to any unreachable service instances on the platform 200. For the root instance A1, the application server 140 may collate the cost of calculations done at dependency (e.g., B1 and B2) via the enumerate interfaces of B1 and B2.

The application servers 140 may calculate a single source shortest path with a source as A1 on the meta graph shown in FIG. 2. One or more application servers 140 calculate the single source shortest path with source as A1 on this meta graph to calculate the cost of the service instance A1 to the active dependency service instances B1 and B2. For example, as shown in FIG. 2, the cost vector for a link between instance A1 to instance B2 may be determined to be 30. The cost vector for a link between instance A1 to instance B1 may be determined to be 120. For instance A1, calculates shortest path by cost to a graph topology consisting of: B(B1, B2, B3, B4, B5), G(G1, G2, G3), F (F1, F2, F3), E (E1, E2, E3, E4)

At step 804, the application server 140 associated with the service instance A1 may determine a service dependency path or a service routing link with a minimum cost vector. Based on the adjacency table associated with a service instance, the minimum cost decision algorithm may be utilized to build the minimum spanning tree on the meta-adjacency graph. A total of all cost vectors of the adjacent table may be determined along each service dependency path. Referring to FIG. 2 and FIG. 5, a first path with part cost of 65 may be selected as a minimum cost vector route. The application server 140 may choose the service dependent path 500 of "A1→B2→G3→F1→E3" (i.e., $S_1 \rightarrow S_5$).

At step 806, the minimum cost algorithm may be used to build the minimum spanning tree on the meta-adjacency graph. The computing system may apply a single node shortest path algorithm to determine and update the lowest cost routes to dependency instances.

Figure 9:
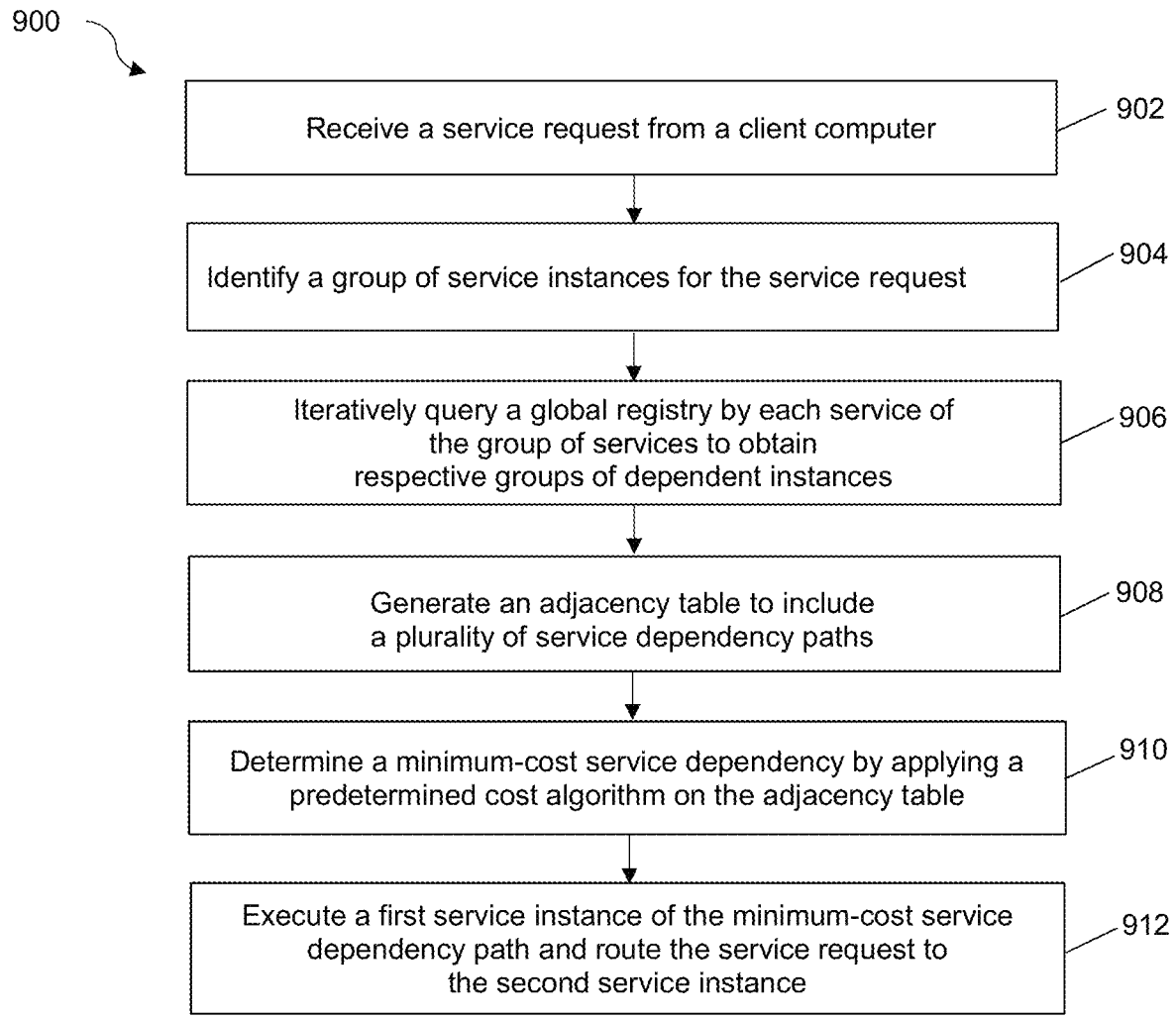
FIG. 9 is a flowchart illustrating an example process configured to discover and link service instances in response to a client request according to an embodiment of the present disclosure.

FIG. 9 is a flowchart illustrating an example process 900 configured to discover and link service instances in response to a client request according to an embodiment of the present disclosure.

At step 902, the computing system may receive a service request for enabling an application service process from a client via a client computer. A user may send the service request via a user interface through an application browser over a network. The service request may be received at center server 120 or global registry host 130 in the cloud computing environment 100 over the networks 110.

At step 904, a group of services may be identified for the service request to perform a service process over the service mesh via networks 110. The group of services may include a front service (e.g. a first service) and an end service (e.g., a second service). In some embodiments, the group of services may include one or more other services between the front service and the end service and form a service dependency path (e.g., FIG. 5). Each service of the group of services may have a plurality of replicated service instances distributed and hosted on application servers located in different geographical areas.

At step 906, each instance associated with the group of services along the service dependency path may iteratively query a global registry to obtain respective groups of active dependent service instances. The process 600 (604, 606 and 608) may be applied to obtain respective groups of active dependent instances along the service dependency path.

At step 908, each of the group of active dependent service instances may collate the dependency (next hops) information to generate an adjacency table. The adjacency table may include a plurality of service dependency paths identified from the respective groups of dependent service instances. Each service dependency path may include a predefined dependency relationships. For example, referring back to FIG. 2, an application service requested by a client may include a plurality of services linked in a predetermined order, such as services A→B→G→F→D→E. The service dependency path may correspond to the predetermined order and the predefined dependency relationship between each pair of adjacent service instances. The service dependency path is associated with a group of services encapsulated in a plurality of containers for enabling or deploying an application service process through the service mesh 200. The example process 600 may be applied to the group of services to build the adjacency table.

At step 910, the computing system may apply a minimum cost algorithm to determine a cost amount for each of the plurality of the service dependency path. The process 800 may be applied on each group of service instance to obtain a respective cost amount. Based on the determination, the computing system may determine one service dependency path having a minimum cost.

At step 912, based on the service dependency path having a minimum cost, the computing system may execute a first service of the minimum-cost service dependency path. The computing system may further route the service inquiry to the second service instance in the service dependency path.

Figure 10:
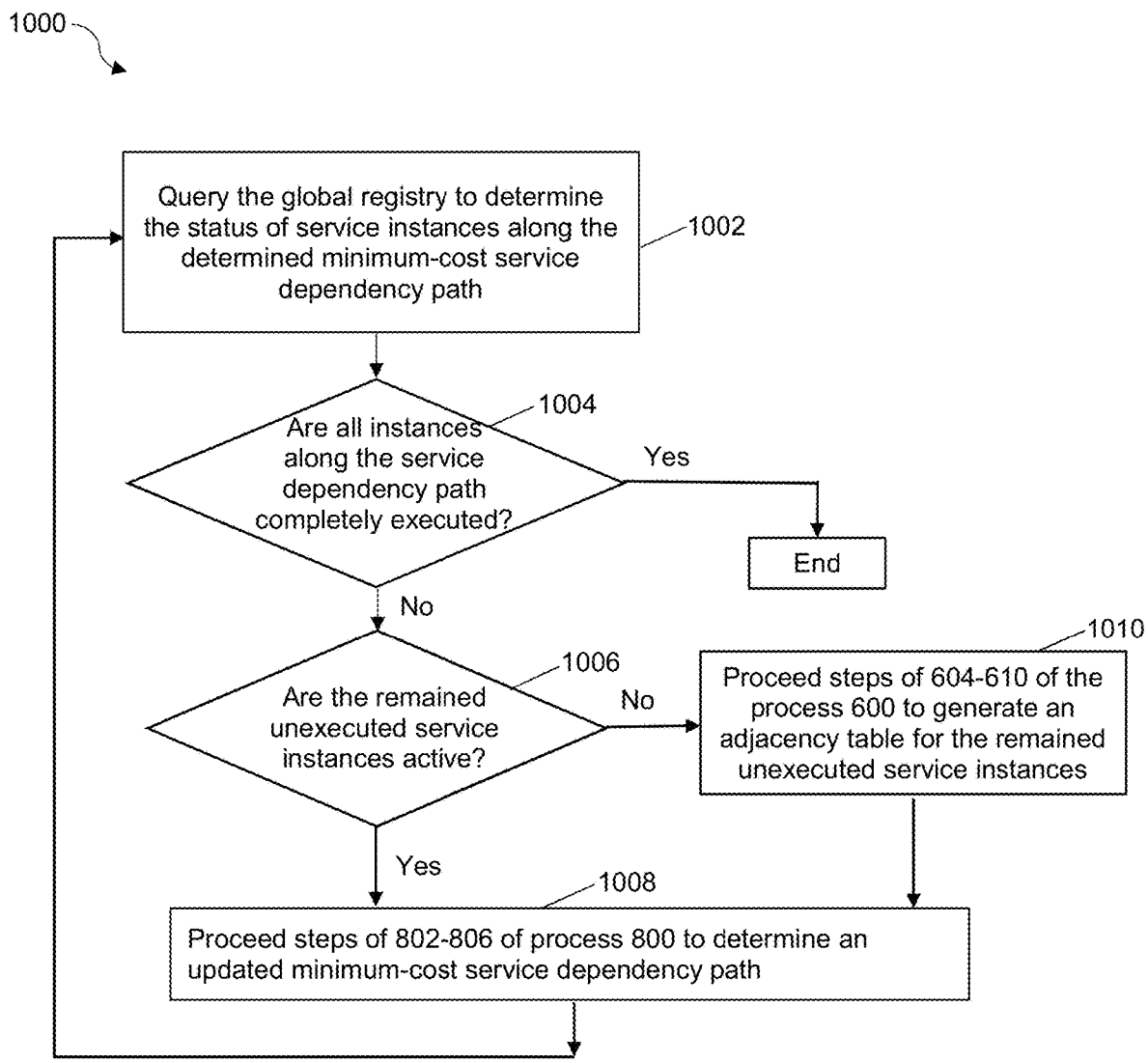
FIG. 10 is a flowchart illustrating an example process of making determination to routing the service instances according to an embodiment of the present disclosure.

FIG. 10 is a flowchart illustrating an example process of making a determination to routing the service instances according to an embodiment of the present disclosure.

Referring to FIG. 5, the application server 140 may execute service instance A1 (e.g., $S_1$) and route the service request to the second dependent service instance $S_2$ along the determined service dependency path 500.

At step 1002, the computing system may then query the global registry 131 to determine the status of service instances along the determined minimum-cost service dependency path. The global registry 131 may dynamically update the runtime status of the first service instance.

At step 1004, the computing system may determine whether all instances along the service dependency path are completely executed. In response to determining all instances along the service dependency path are completely executed or identifying an executed end service associated with the service dependency path, the computing system may terminate the meta graph associated with the service mesh 200.

At step 1006, in response to determining an incomplete service dependency path, the reminded service instances may query a global registry 131 to determine whether the remained one or more unexecuted service instances along the determined service dependency path are still active to ensure no links between services in meta-graph is broken.

At step 1008, in response to determine that one or more unexecuted services along the determined service dependency path are active, the steps of 802-806 of the process 800 may be iteratively applied to the reminded unexecuted service instances until the last service instance of the determined service dependency path is executed.

At step 1010, in response to determine that one or more unexecuted services along the determined service dependency path are not active, the steps of 604-610 of the process 600 may be iteratively applied to the reminded unexecuted service instances to update the adjacency table.

The process 600 and process 800 may be performed alternatively until the end service instance associated with the service request is executed.

In some embodiments, the dynamic min-cost circulation path ensures all scenarios that a service is undergoing and take them into account e.g. service upgrade, security non-compliance of a service-instance, that could be queries via the/enumerate interface.

In some embodiments, if a service endpoint is unavailable during the periodic shortest path checks then the paths (in FIB per FIG. 3) are re-calculated per the costs in transient time. The path to the dependency services is routed per the adjacency table to ensure that end to end traffic flow is always maintained In some embodiments, if a service endpoint is dormant and the root service instance (e.g. A1) senses service degradation, it may leverage the invoke interface as per the next low-cost adjacent to maintain a traffic flow for incoming requests.

The embodiments described herein also improve the technical fields of routing micro/nano-services over the service mesh in a minimum cost circulation topology. For example, an upstream service may provide a proactive topology information of downstream services at each level with a clear visibility on the happenings at each level. The present disclosure improves Quality of Service (QoS) in dependency service. For example, an upstream service can self re-route to the best QoS in dependency service in an effort to maintain a dependency spanning tree of itself as the root service and its dependency. An upstream root service can instantly discover and re-route to an alternate optimal service instance when the current next service offers higher cost.

The embodiments described herein provide a system and method to build a dependent service graph as a front loaded step and sets up the services mesh for optimal quality of service, availability and operability proactively than reactively. The system and method described thereof enable a birds eye view of dynamics in the services mesh and offers self organizing algorithm to proactively resolve outages downstream or traffic surge upstream. The system may enable spanning dynamic service endpoints through service instance architecture per the traffic load projections as visible at ingress to the root or origin service instance(s). The embodiments described herein may build a dependent service graph as a front loaded step and set up the services mesh for optimal quality of service, availability and operability proactively than reactively in current state.

Figure 11:
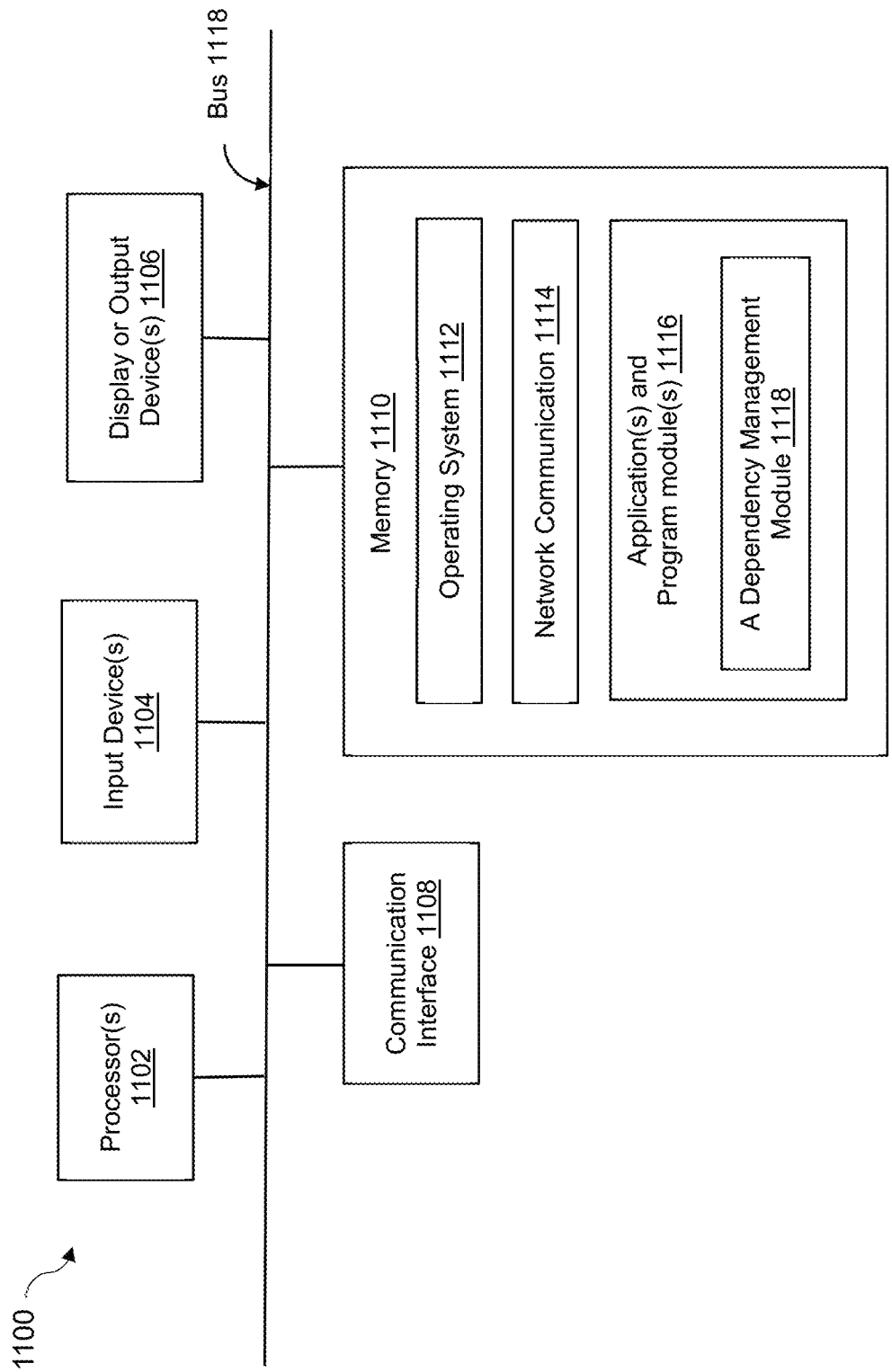
FIG. 11 is a block diagram of an example computing device according to some embodiments of the present disclosure.

FIG. 11 is a block diagram of an example computing device 1100 that may be utilized to execute embodiments to implement processes including various features and functional operations as described herein. For example, computing device 1100 may function as application server 120, global registry host 120, application server 140, client computer 150 or a portion or combination thereof in some embodiments. The computing device 1100 may be implemented on any electronic device to execute software applications derived from program instructions for services and micro/nano-service and as illustrated in FIGS. 2-4, and includes but not limited to personal computers, servers, smartphones, media players, electronic tablets, game consoles, email devices, etc. In some implementations, the computing device 1100 may include one or more processors 1102, one or more input devices 1104, one or more display or output devices 1106, one or more communication interfaces 1108, and memory 1110. Each of these components may be coupled by bus 1118, or in the case of distributed computer systems, one or more of these components may be located remotely and accessed via a network.

Processor(s) 1102 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-transitory memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

Input device 1104 may be any known input device technology, including but not limited to a keyboard (including a virtual keyboard), mouse, track ball, and touch-sensitive pad or display. To provide for interaction with a user, the features and functional operations described in the disclosed embodiments may be implemented on a computer having a display device 1106 such as a CRT (cathode ray tube) or LCD (liquid crystal display) monitor for displaying information to the user and a keyboard and a pointing device such as a mouse or a trackball by which the user can provide input to the computer. Display device 1006 may be any known display technology, including but not limited to display devices using Liquid Crystal Display (LCD) or Light Emitting Diode (LED) technology.

Communication interfaces 1008 may be configured to enable computing device 1100 to communicate with other another computing or network device across a network, such as via a wired connection, a wireless connection, or a combination of wired and wireless connections. For example, communication interfaces 1008 may include an Ethernet interface, an optical interface, a coaxial interface, an infrared interface, a radio frequency (RF) interface, a universal serial bus (USB) interface, a Wi-Fi interface, a cellular network interface, or the like.

Memory 1110 may be any computer-readable medium that participates in providing computer program instructions and data to processor(s) 1102 for execution, including without limitation, non-transitory computer-readable storage media (e.g., optical disks, magnetic disks, flash drives, etc.), or volatile media (e.g., SDRAM, ROM, etc.). Memory 1110 may include various instructions for implementing an operating system 1012 (e.g., Mac OS®, Windows®, Linux). The operating system may be multi-user, multiprocessing, multitasking, multithreading, real-time, and the like. The operating system may perform basic tasks, including but not limited to: recognizing input from input device 1104; sending output to display device 1106; keeping track of files and directories on memory 1110; controlling peripheral devices (e.g., disk drives, printers, etc.) which can be controlled directly or through an I/O controller; and managing traffic on bus 718. Bus 1118 may be any known internal or external bus technology, including but not limited to ISA, EISA, PCI, PCI Express, NuBus, USB, Serial ATA or FireWire.

Network communications instructions 1014 may establish and maintain network connections (e.g., software applications for implementing communication protocols, such as TCP/IP, HTTP, Ethernet, telephony, etc.).

Application(s) and program models 1116 may include software application(s) and different functional program modules which are executed by processor(s) 1102 to implement the processes described herein and/or other processes. For example, the program modules 1016 may include a dependency management module 1118 for generating service dependency and/or dependent service instants in response to inquiries for routing and deploying program components and application processes. The program modules 1116 may include but not limited to software programs, machine learning models, objects, components, data structures that are configured to perform particular tasks or implement particular data types. The processes described herein may also be implemented in operating system 1012.

The features and functional operations described in the disclosed embodiments may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

The described features and functional operations described in the disclosed embodiments may be implemented in a computer system that includes a back-end component, such as a data server, or that includes a middleware component, such as an application server or an Internet server, or that includes a front-end component, such as a user computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include user computing devices and application servers. A user or client computing device and server may generally be remote from each other and may typically interact through a network. The relationship of client computing devices and server may arise by virtue of computer programs running on the respective computers and having a client-server relationship to each other.

One or more features and functional operations described in the disclosed embodiments may be implemented using an API. An API may define one or more parameters that are passed between an application and other software instructions/code (e.g., an operating system, library routine, function) that provides a service, that provides data, or that performs an operation or a computation. Communication between various network and computing devices may be facilitated by one or more application programming interfaces (APIs). APIs of system 1200 may be proprietary and/or may be examples available to those of ordinary skill in the art such as Amazon® Web Services (AWS) APIs or the like. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112 (f). Claims that do not expressly include the phrase "means for" or "step for" are not to be interpreted under 35 U.S.C. 112 (f).

What is claimed is:

1. A method implemented by a computing system, the computing system comprising one or more processors and one or more non-transitory computer-readable storage devices having computer-executable computer instructions storing which, when executed by one or more processors, cause the one or more processors to perform operations comprising:
   receiving, from a client computer, a service request;
   identifying a group of different services for the service request, each service being represented by a plurality of replicated service instances, each service instance being configured to identify its dependency with other service instances and executed by an application server;
   iteratively querying a global registry for each service of the group of services to obtain respective groups of active service instances;
   generating an adjacency table including a plurality of service dependency paths, each service dependency path comprising the respective group of different active service instances with respective dependency between one another;
   determining a minimum-cost service dependency path by applying a predetermined cost algorithm on the adjacency table; and
   executing a first service instance of the minimum-cost service dependency path and routing the service request to execute a second service instance in the minimum-cost dependency path.

2. The method of claim 1, wherein the instructions further cause the one or more processors to perform:
   querying the global registry to determine the status of service instances along the determined minimum-cost service dependency path.

3. The method of claim 1, wherein generating the adjacency table comprises:
   identifying a list of service instances associated with a service dependency path for a service request;
   querying the global registry to retrieve a list of active dependency service instances;
   retrieving corresponding instance metadata associated with the list of active dependency service instances; and iterating adjacent dependency service instances to build respective Forwarding Information Bases (FIB) each associated with respective dependency service instances.

4. The method of claim 1, wherein determining the minimum-cost service dependency path comprises:
    determining a cost vector for each link between respective adjacent dependency service instances in the adjacency table;
    determining a cost vector sum for the plurality of the service dependency paths in the adjacency table; and
    building a minimum spanning tree on a meta-adjacency graph.

5. The method of claim 1, wherein the plurality of replicated service instances are deployed to be executed on one or more application servers in different geographical areas.

6. The method of claim 1, wherein each service instance deployed on an application server in a service mesh is registered with the global registry with corresponding metadata and runtime status over a network.

7. The method of claim 1, wherein each service instance runs in a container in a service mesh and wherein the container comprises a Forwarding Information Base (FIB) configured to store the adjacency table, and wherein the global registry is configured to automatically discover and update the runtime status of the service instances.

8. The method of claim 1, wherein the service request from the client application is generated using an application programming interface (API) through the client computer.

9. The method of claim 1, wherein the instructions further cause the one or more processors to perform:
    determining whether each service instance of the minimum-cost service dependency path is executed;
    upon determining one or more service instances along the minimum-cost service dependency path are not executed, querying the global registry to determine whether the one or more unexecuted service instances are still active;
    in response to determining that the one or more unexecuted services along the determined service dependency path are not active, iteratively querying the global registry for each unexecuted service to obtain respective groups of corresponding active service instances;
    generating an updated adjacent table for the one or more unexecuted service instances; and
    executing the one or active service instances until an end service instance associated with the service request is executed.

10. A computing system, comprising:
    one or more processors; and
    one or more non-transitory computer-readable storage devices storing computer-executable instructions, the instructions operable to cause the one or more processors to perform operations comprising:
    receiving, from a client computer, a service request;
    identifying a group of different services for the service request, each service being represented by a plurality of replicated service instances, each service instance being configured to identify its dependency with other service instances and executed by an application server;
    iteratively querying a global registry for each service of the group of services to obtain respective groups of active service instances;
    generating an adjacency table including a plurality of service dependency paths, each service dependency path comprising the respective group of different active service instances with respective dependency between one another;
    determining a minimum-cost service dependency path by applying a predetermined cost algorithm on the adjacency table; and
    executing a first service instance of the minimum-cost service dependency path and routing the service request to execute a second service instance in the minimum-cost dependency path.

11. The computing system of claim 10, wherein the instructions are further operable to cause the one or more processors to perform:
    querying the global registry to determine the status of service instances along the determined minimum-cost service dependency path.

12. The computing system of claim 10, wherein generating the adjacency table comprises:
    identifying a list of service instances associated with a service dependency path for a service request;
    querying the global registry to retrieve a list of active dependency service instances;
    retrieving corresponding instance metadata associated with the list of active dependency service instances; and
    iterating adjacent dependency service instances to build respective Forwarding Information Bases (FIB) each associated with respective dependency service instances.

13. The computing system of claim 10, wherein determining the minimum-cost service dependency path comprises:
    determining a cost vector for each link between respective adjacent dependency service instances in the adjacency table;
    determining a cost vector sum for each of the plurality of the service dependency paths in the adjacency table; and
    building a minimum spanning tree on a meta-adjacency graph.

14. The computing system of claim 10, wherein the plurality of replicated service instances are deployed to be executed on one or more application servers in different geographical areas.

15. The computing system of claim 10, wherein each service instance deployed on an application server in a service mesh is registered with the global registry with corresponding metadata and runtime status over a network.

16. The computing system of claim 10, wherein each service instance runs in a container in a service mesh and wherein the container comprises a Forwarding Information Base (FIB) configured to store the adjacency table, and wherein the global registry is configured to automatically discover and update the runtime status of the service instances.

17. The computing system of claim 10, wherein the service request from a client application is generated using an application programming interface (API) through the client computer.

18. A computing system, comprising:
    one or more processors; and
    one or more non-transitory computer-readable storage devices storing computer-executable instructions, the instructions operable to cause the one or more processors to perform operations comprising:

receiving, from a client computer, a service request;

identifying a group of different services for the service request, each service being represented by a plurality of replicated service instances, each service instance being configured to identify its dependency with other service instances and executed by an application server;

iteratively querying a global registry for each service of the group of services to obtain respective groups of active service instances;

generating an adjacency table including a plurality of service dependency paths, each service dependency path comprising the respective group of different active service instances with respective dependency between one another;

determining a minimum-cost service dependency path by applying a predetermined cost algorithm on the adjacency table;

executing a first service instance of the minimum-cost service dependency path and routing the service request to execute a second service instance in the minimum-cost dependency path; and querying the global registry to determine respective statuses of respective service instances along the determined minimum-cost service dependency path.

19. The computing system of claim 10, wherein the instructions are further operable to cause the one or more processors to perform:

determining whether each service instance of the minimum-cost service dependency path is executed;

upon determining one or more service instances along the minimum-cost service dependency path are not executed, querying the global registry to determine whether the one or more unexecuted service instances are still active;

in response to determining that the one or more unexecuted services along the determined service dependency path are not active, iteratively querying the global registry for each unexecuted service to obtain respective groups of corresponding active service instances;

generating an updated adjacent table for the one or more unexecuted service instances; and executing the one or active service instances until an end service instance associated with the service request is executed.

20. The computing system of claim 18, wherein each service instance runs in a container in a service mesh and wherein the container comprises a Forwarding Information Base (FIB) configured to store the adjacency table.

* * * * *